United States Patent [19]

Aho

[11] Patent Number: 5,431,603
[45] Date of Patent: Jul. 11, 1995

[54] TRANSFER CASE HAVING SELECTIVE DRIVE FLUID COUPLING

[75] Inventor: Richard E. Aho, Fort Lauderdale, Fla.

[73] Assignee: MileMarker, Inc., Pompano Beach, Fla.

[21] Appl. No.: 87,483

[22] Filed: Jul. 6, 1993

[51] Int. Cl.⁶ ............... F16D 35/02; F16H 48/26
[52] U.S. Cl. ......................... 475/84; 475/88; 475/91; 192/58 B
[58] Field of Search ............ 475/59, 83, 84, 87, 475/88, 89, 91; 192/58 A, 58 B

[56] References Cited

U.S. PATENT DOCUMENTS

| | | | |
|---|---|---|---|
| 4,031,780 | 6/1977 | Dolan et al. | 475/85 |
| 4,037,429 | 7/1977 | Britzius | 180/233 |
| 4,083,419 | 4/1978 | Fogelberg | 74/665 T X |
| 4,132,297 | 1/1979 | Brown et al. | 74/665 G X |
| 4,332,304 | 6/1982 | Barnow | 180/233 |
| 4,557,359 | 12/1985 | Woodbridge | 180/248 X |
| 4,650,028 | 3/1987 | Eastman et al. | 74/650 X |
| 4,677,875 | 7/1987 | Batchelor | 180/249 X |
| 4,714,129 | 12/1987 | Mueller | 180/247 X |
| 4,782,930 | 11/1988 | Kuroiwa et al. | 172/58 C |
| 4,928,803 | 5/1990 | Ishikawa et al. | 192/58 B |
| 4,949,594 | 8/1990 | Galhotra | 74/650 |
| 5,006,098 | 4/1991 | Yoshinaka et al. | 475/86 |
| 5,117,937 | 6/1992 | Namioka | 74/665 T X |

FOREIGN PATENT DOCUMENTS

| | | | |
|---|---|---|---|
| 2620188 | 3/1989 | France | 475/88 |
| 1333878 | 10/1973 | United Kingdom | 475/87 |

OTHER PUBLICATIONS

Reader's Digest, *Complete Car Care Manual*, p. 104.
New Venture Gear, Model 241 Transfer Case (brochure).

Primary Examiner—Dirk Wright
Assistant Examiner—Khoi Q. Ta
Attorney, Agent, or Firm—Luedeka, Neely & Graham

[57] ABSTRACT

The specification discloses a transfer case for four-wheel-drive vehicles. In one embodiment, the transfer case includes a fluid coupling and rotation of an input shaft is transferred to a front drive shaft by a pair of opposed rotatable rings having interleaved fins. The interleaved fins provide fluid filled chambers and relative movement of the fins compresses the fluid and increases the ability of the fluid to transfer torque.

1 Claim, 6 Drawing Sheets

TRANSFER CASE HAVING SELECTIVE DRIVE FLUID COUPLING

TECHNICAL FIELD

The present invention relates generally to power transfer systems. More particularly the present invention relates to a transfer system having a fluid coupling for use with multi-wheel-drive (e.g. four-wheel-drive) vehicles.

BACKGROUND

Typical four-wheel-drive vehicles have a front-mounted engine which drives the rear wheels through a transmission, rear drive shaft and rear axle. A transfer case (FIG. 7) mounted between the transmission and rear drive shaft typically contains a two-speed transmission that provides an extra-low range of gears to supply additional torque for towing heavy loads and climbing steep inclines. The transfer case also transfers engine torque to a front drive shaft that runs forward to a front differential and axle. Typical transfer cases for four wheel-drive vehicles enable two modes of operation: (1) locked four-wheel drive in which torque is directly transferred to both the front and rear wheels or (2) two wheel drive in which no torque is transferred to the front wheels. If a two-speed transmission is included, four modes are enabled, i.e. high and low gear operation for each of the above-described modes. This is limiting, since direct-drive four wheel drive transfer systems are susceptible to damage. For example, during off-road racing, a four-wheel-drive vehicle may encounter a situation wherein the front wheels leave the ground and the rotational rate of the front wheels increases greatly. This situation is particularly damaging to conventional transfer cases, with damage typically occurring when the front wheels reengage the ground and large torque forces are applied to the vehicle drive train. The present invention is advantageous in that it allows slippage in this situation which helps prevent damage to drive train components.

SUMMARY OF THE INVENTION

Accordingly it is an object of the present invention to provide an improved transfer case;

It is yet another object of the present invention to provide a transfer case having a fluid coupling that helps to prevent damage to drive train components;

Still another object of the present invention is to provide a transfer case of the character described that is uncomplicated in configuration;

Yet another object of the present invention is to provide a transfer case having a fluid coupling that increases torque transfer in response to relative movement between coupling surfaces by exerting pumping forces on the fluid.

Having regard to the foregoing objects, the present invention is directed generally to a transfer case for selectively transferring rotational motion of a rotatable input shaft to first and second rotational output shafts. The transfer case includes a housing, a driven gear located within the housing and connected to the input shaft for being rotatably driven by the input shaft, a mechanical system for coupling the first output shaft to the input shaft, and a fluid coupling located within the housing for coupling the driven gear to the second output shaft. The fluid coupling includes a first rotatable body, a second rotatable body connected to the second output shaft, a plurality of substantially cylindrical substantially concentric first fins extending outwardly from the first rotatable body and defining a plurality of substantially cylindrical substantially concentric cavities, a plurality of substantially cylindrical substantially concentric second fins extending outwardly from the second rotatable-body, each of the second fins being disposed within one of the cavities, a viscous fluid disposed within the cavities for contacting the first and second fins, a support associated with the first and second rotatable bodies for maintaining the second fins within the cavities, and a seal associated with the first and second rotatable bodies and defining a sealed reservoir around the first and second fins for containing the viscous fluid. The transfer case further includes a connector for engaging the driven gear and the first rotatable body for connecting the driven gear to the first rotatable body so that the first rotatable body is rotatable in response to rotation of the driven gear, and rotational motion of the first rotatable body is imparted by the viscous fluid to the second rotatable body.

The present invention is particularly well-suited for use with four-wheel-drive vehicles. To this end, the invention is described below in connection with a transfer case for use with four-wheel-drive vehicles.

These and other objects, features and advantages of the present invention will become apparent from the following detailed description and when considered in accordance with the appended claims and accompanying drawings, in which:

DETAILED DESCRIPTION OF A PREFERRED EMBODIMENT

Figure 1:
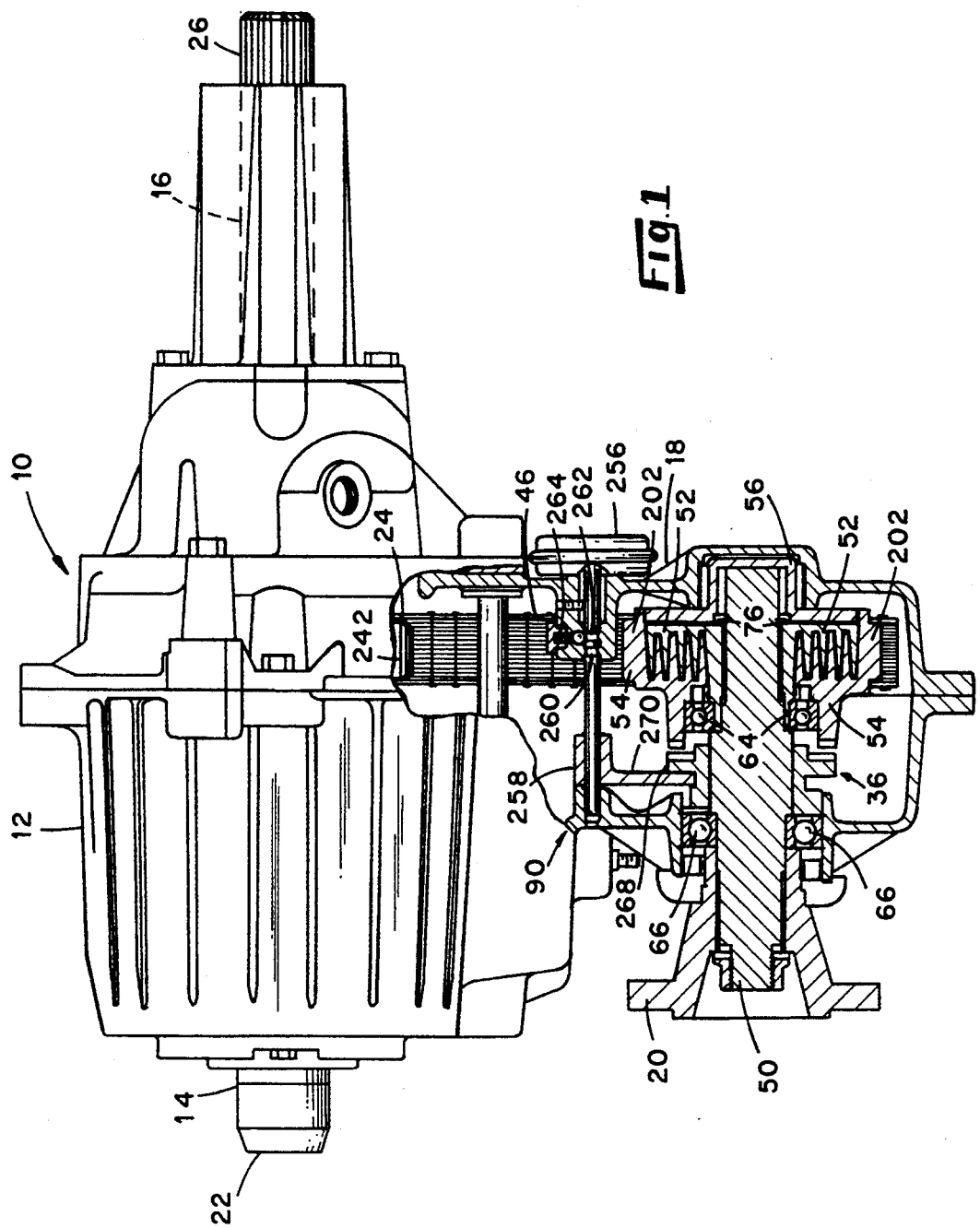
FIG. 1 is a cross-sectional view of a preferred embodiment showing a transfer case having a fluid coupling in accordance with the present invention.

Referring now to the drawings, in which like characters refer to like parts throughout the several views, FIG. 1 shows a transfer case 10 embodying the present invention. The transfer case 10 includes a main housing 12 out of which extends an input shaft 14 and a rear output shaft 16, and a coupling housing 18 mounted below the main housing 12 and out of which extends a front output shaft 20. Optionally, a two-speed transmission (not shown) may be provided within the main housing 12 between the input shaft 14 and the rear output shaft 16 to provide an extra-low range of gears.

The input shaft 14 extends out of an opening in the housing 12 and includes a female end 22 located exteriorly of the housing 12 for connecting to a transmission (not shown) of a four-wheel-drive vehicle. The input shaft 14 terminates interiorly of the housing 12 and connects to both a driven transfer gear 24 and to an interior end (not shown) of the rear output shaft 16. The shaft 16 also extends out through an opening in the housing 12 and has a splined end 26 located exteriorly of the housing 12 for engaging a rear drive shaft 28 (see FIG. 3).

Figure 2:
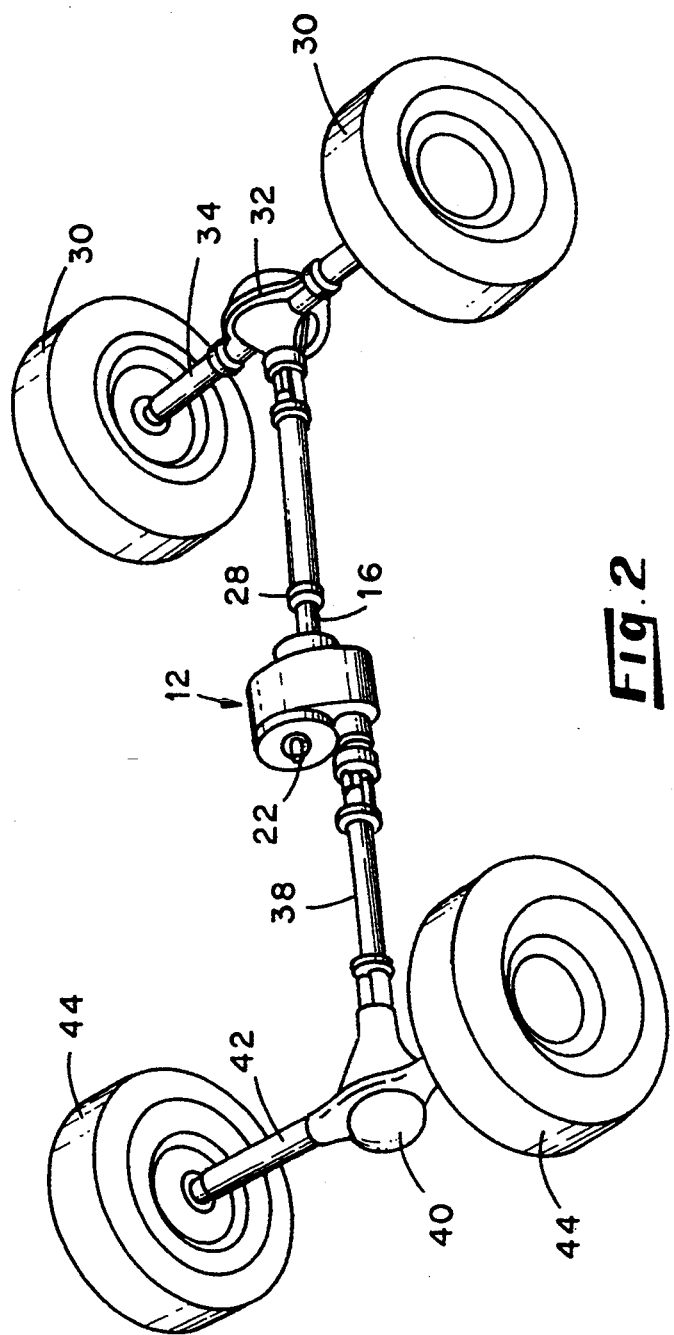
FIG. 2 is a perspective view of a four-wheel-drive chassis showing the location of the transfer case of FIG. 1.

With additional reference to FIG. 2, the transfer case 10 drives rear wheels 30 of a four-wheel-vehicle through the rear shaft 28 and a rear differential 32 and a rear axle 34. A fluid coupling 36 located within the coupling housing 18 transfers engine torque to a front drive shaft 38, a front differential 40 and front axle 42 to drive front wheels 44 of the vehicle. Torque is transferred from the driven transfer gear 24 to the fluid coupling 36 by a chain 46, as will be explained more fully below.

For the sake of clarity, the construction and operation of the fluid coupling 36 will be described first.

The Fluid Coupling

Figure 3:
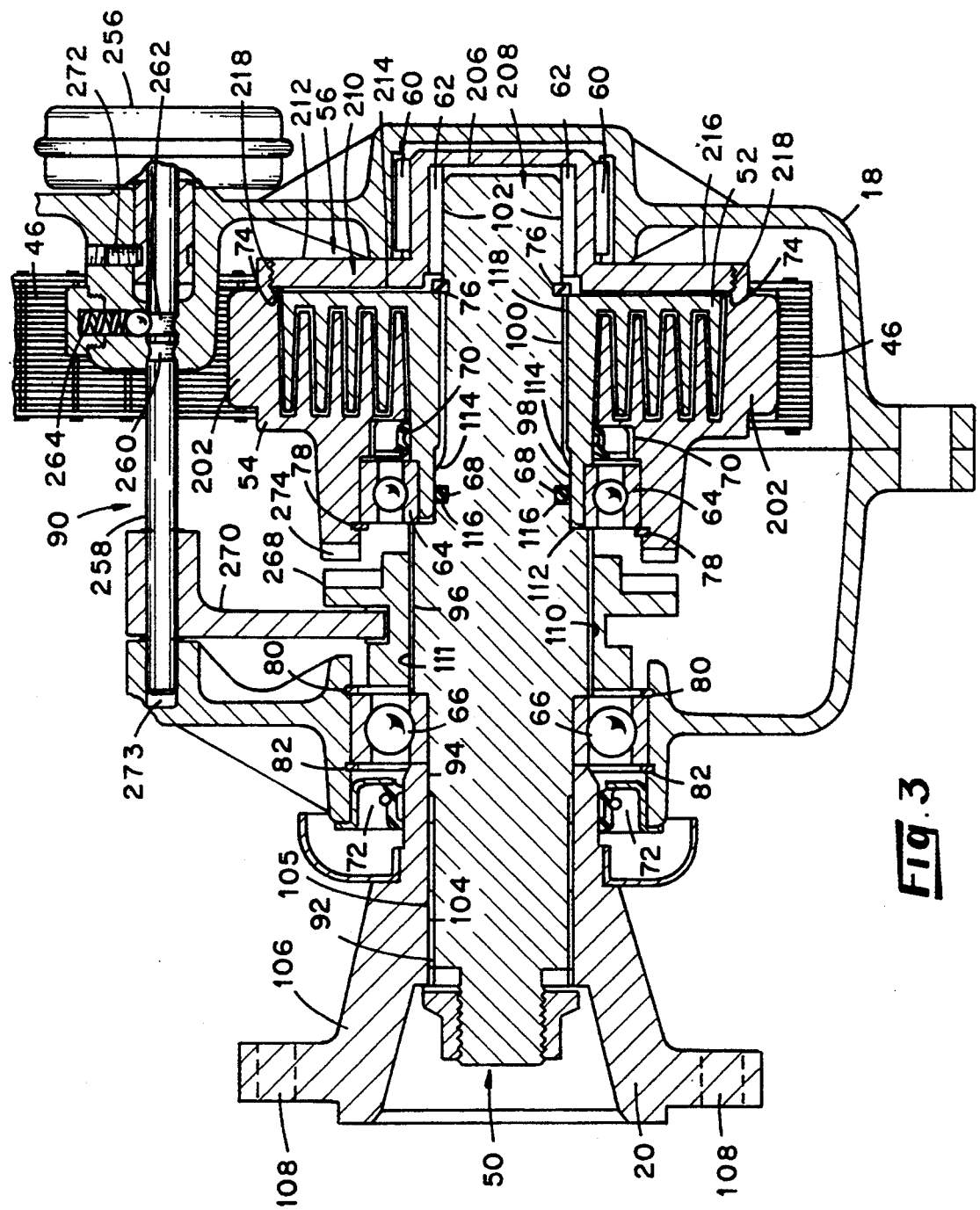
FIG. 3 is an enlarged view of a fluid coupling used in the transfer case of FIG. 1.

With reference now to FIG. 3, the fluid coupling 36 includes, as major components, a rotatable splined shaft 50, a rotatable center ring 52, a rotatable body ring 54 and a cap 56. Each of the above components is preferably formed of a durable material, such as hardened steel.

A pair of needle bearings 60 and 62, a pair of roller bearings 64 and 66, O-ring 68, a pair of fluid seals 70 and 72, a copper gasket 74, and retaining rings 76, 78, 80 and 82 are included as minor components of the coupling 11.

Briefly described, the coupling 36 is assembled as follows. The seal 70, and bearing 64 are press-fit, in sequence, onto the body ring 54 and held in place by retaining ring 78, and the body ring 54 is filled with a highly viscous fluid, preferably silicone having a rating of about 30,000,000 centipoise. The center ring 52 is then press-fit in a mating relationship with the body ring as will be explained below, to provide a fluid filled reservoir therebetween. The resulting structure is fittingly received on the shaft 50 with O-ring 68 and held in place by the retaining ring 80. The bearing 66 is then press-fit around the shaft 50 against the retaining ring 80 and held in place by retaining ring 82. The cap 56 is threadably received by the body ring 54 with the gasket 74 therebetween and the assembled structure is press-fit into the housing 18 with the exterior annular surface of the cap adjacent the bearing 60, as seen in FIG. 3.

Advantageously, the transfer case may be operated in three modes (six modes, i.e. high and low within each type of operation, if the optional two-speed transmission is provided within the transfer case, as described above). In one mode, the fluid coupling may be disengaged, as with locking hubs on the front wheels or with a so-called "shift on the fly" feature. The "shift-on-the-fly" feature of the type common to four-wheel drive vehicles disengages the front end, so that the transfer case transfers torque only to the rear wheels of the vehicle.

In a second mode of operation a dog clutch 90 (see FIG. 3) is engaged, as by vacuum, to directly connect the center ring 52 to the body ring 54 to provide locked four-wheel-drive, as will be explained more fully below.

In a third and preferred mode of operation, the dog clutch 90 is disengaged and engine torque is coupled to the front wheels 44 of the vehicle are coupled to the transmission to the transfer case 10 by the fluid coupling 36 to give selective four-wheel-drive capabilities. This is advantageous to permit relative motion or slippage between components of the coupling under certain situations to help prevent damage to drive train components.

In this third mode of operation, the transfer case 10 transfers rotational forces from the engine and transmission of the four-wheel-drive vehicle to the front wheels 44 via the fluid coupling 36 and the fluid coupling 36 selectively couples torque to the front wheels 44 of the vehicle. To this end, the chain 46 is positioned within the transfer case 10 to directly and rotatably engage tooth sprockets defined on the outer periphery of the body ring 16 to impart rotational forces from the driven gear 24 to the body ring 54, as will be described in more detail below.

Rotation of the body ring 54 by the chain 46 is coupled to the center ring 52 by the viscous fluid contained in the reservoir between the body ring 54 and the center ring 52 to rotate the center ring 52. As will be explained more fully below, the center ring 52 and the body ring 54 are rotatably coupled solely by the viscous fluid. Therefore the body ring 54 and the center ring 52 may slip relative to one another (i.e. the center ring and the body ring are capable of rotational movement relative to one another).

As will be seen, the configuration of the center ring 52 and the body ring 54 and their position relative to one another results in a "pumping action" on the fluid when the body ring 54 and center ring 52 slip or move relative to one another. This pumping action compresses the fluid and the compressed fluid is capable of transferring more force from the body ring 54 to the center ring 52 than uncompressed fluid. In this manner, the torque transferred from the body ring 54 to the center ring 52, and hence from the transfer case 10 to the front wheels 44 of the vehicle, increases as more relative slip occurs between the center ring 52 and the body ring 54.

Accordingly, as used herein, the terms "pump", "pumping" and "pumping action" refer to forces acting on the viscous fluid when the center ring 52 and the body ring 54 move relative to one another and to the effect of these pumping forces on increasing the torque transferred from the body ring 54 to the center ring 52 as more relative slip occurs. Accordingly, in the absence of relative slip, the center ring 52 and the body ring 54 rotate at the same rotational rate and there is no "pumping action" on the viscous fluid.

Shaft

With further reference to FIGS. 1 and 3, the splined shaft 50 is an elongate, cylindrical shaft having a splined output end 92, an extension section 94, an intermediate splined section 96, an intermediate section 98, a splined section 100, and an interior end 102. The splined section 92 provides a plurality of elongate splines 104 on the exterior thereof for fittingly engaging an interior annular surface 105 of an output flange 106 connected, as by bolts through bolt openings 108, to the front drive shaft 38.

The intermediate splined section 96 provides a plurality of elongate splines 110 on the exterior thereof for fittingly engaging an interior annular surface 111 of the dog clutch 90, for providing direct 4-wheel-drive capabilities (i.e., the second mode of operation), as will be explained more fully below. The intermediate section 98 defines an annular shoulder 112 and a curved annular surface 114 for receiving the center ring 52.

An annular groove 116 is defined on the intermediate section 98 at a predetermined location between the shoulder 112 and the curved surface 114. The groove 116 is sized to receive the O-ring 68, which is provided to prevent leakage of the viscous fluid along the shaft 12.

The splined section 100 has a plurality of elongate splines 118 defined on the periphery thereof for engaging the center ring 52, as will be explained below. Preferably there are about 19 of the splines 118, each spline 118 having a pitch of about 16/31, a pressure angle of about 30°, and a major diameter of about 1.246 inches.

Center Ring

Figure 4:
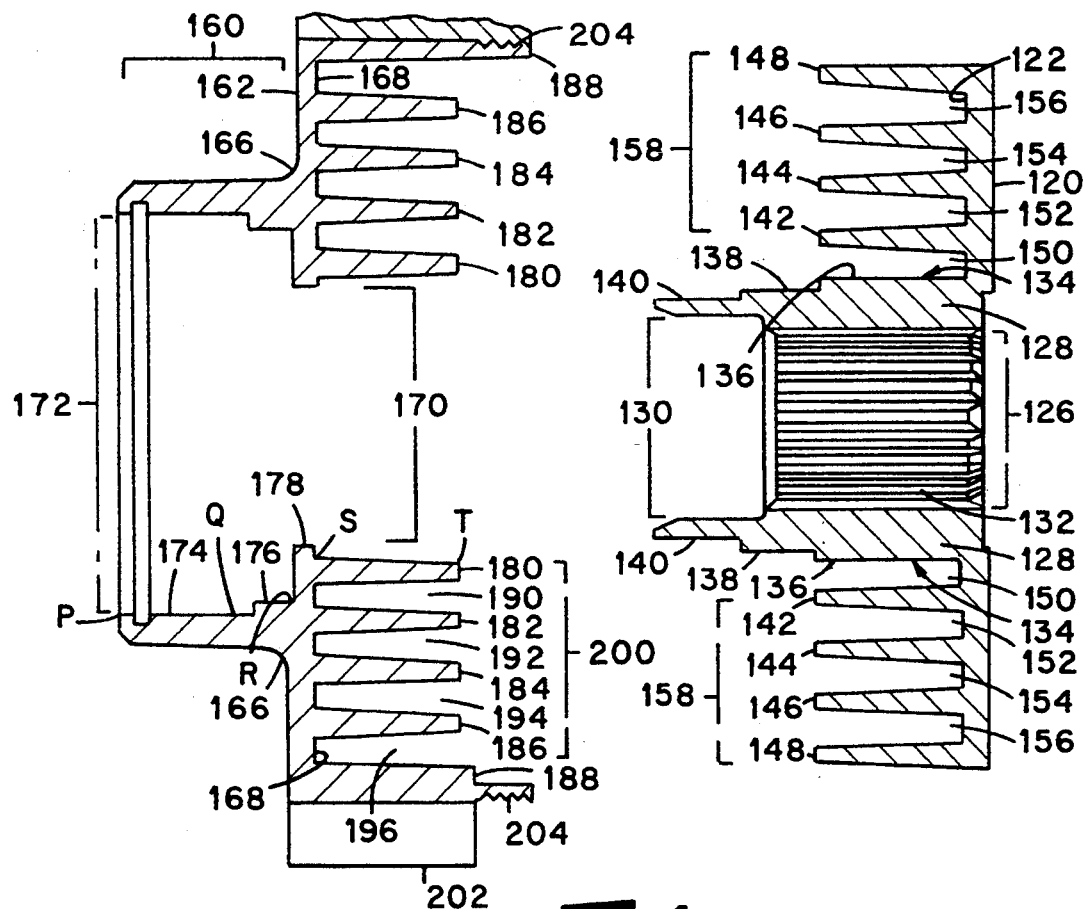
FIG. 4 is an exploded view of a center ring and body ring used in the fluid coupling of FIG. 1.

With additional reference to FIG. 4, the center ring 52 is provided by a flat disk 120 having a diameter of about 4.63 inches and a front surface 122 spaced apart from a rear surface 124 so that the disk 120 has a thickness of about 0.150 inches. An opening 126 is defined across the central thickness of the disk 120 and is sized to fittingly receive the splined section 100 of the shaft 12 therethrough.

A cylindrical extension 128 having an inner diameter corresponding generally to the diameter of the opening 126 extends outwardly from the front surface 122 of the disk 120. The inner diameter of the extension 128 is sized to slip over the intermediate section 98 of the shaft.

The extension 128 is integral with the front surface 122 adjacent the opening 126 so that together the extension 128 and the opening 126 provide an elongate tunnel 130 for receiving the splined section 100 of the shaft 50. A plurality of teeth 132 are provided on the inner periphery of the extension 128 for engaging the splines 118 of the shaft 50 so that rotation of the body ring 54 coupled to the center ring 52 rotatably drives the shaft 50.

Outer periphery 134 of the extension 128 is of stepped configuration and provides annular shoulders 136, 138, and 140. The shoulder 136 is adjacent the front surface 122 and has a width of about 1 inch and an outer diameter of 1.91 inches, the shoulder 138 is adjacent the shoulder 136 opposite the front surface 122 and has a width of about 0.56 inches and an outer diameter of about 1.75 inches, and the shoulder 140 is adjacent the shoulder 138 opposite the shoulder 136 and has a width of about 0.58 inches and an outer diameter of about 1.57 inches. The shoulder 136 is preferably tapered such that it decreases in thickness in a direction away from the front surface 122, as will be explained more fully below.

Annular fins 142, 144, 146 and 148 extend outwardly about 1 inch from the front surface 122 in a direction such that the major surfaces of the fins 142-148 are generally perpendicular to the front surface 122. The fins 142-148 are substantially concentric and are preferably substantially circular in cross-section and tapered such that they decrease in thickness in a direction away from the front surface 122, as will be explained more fully below.

Corresponding and substantially concentric annular cavities 150, 152, 154 and 156 are defined between adjacent annular surfaces of the fins 142, 144, 146, 148, and the extension 128, to wit: annular cavity 106 is formed by the outer periphery 134 of the extension 128 and the inner diameter of fin 142, annular cavity 152 is formed by the outer periphery of fin 142 and the inner periphery of the fin 144, annular cavity 154 is formed by the outer periphery of fin 144 and the inner periphery of fin 146, and annular cavity 156 is formed by the outer periphery of fin 146 and the inner periphery of fin 148.

Together, the fins 142-148 and cavities 150-156 provide a contoured annular pump surface 158 that cooperates with the body ring 54 to exert pumping forces on the viscous fluid when the center ring 52 and the body ring 54 move relative to one another during operation of the coupling 36, as will be explained more fully below.

In a preferred embodiment, the fins 142-148 are preferably substantially circular in shape and are preferably substantially concentric, although it will be understood that the fins may be non-circular and/or nonconcentric. Examples of non-circular fin shapes include oval, octagonal, hexagonal shaped fins that appear as sockets extending lengthwise from the front surface 76, or any similar shaped fins to create the desired pumping action, as described in my co-pending U.S. patent application Ser. No. 08/005,562 entitled "Selective Drive Fluid Coupling" and incorporated herein by reference. In addition, it will be understood that virtually any number of fins may be provided, depending on the desired torque characteristics.

Figure 8:
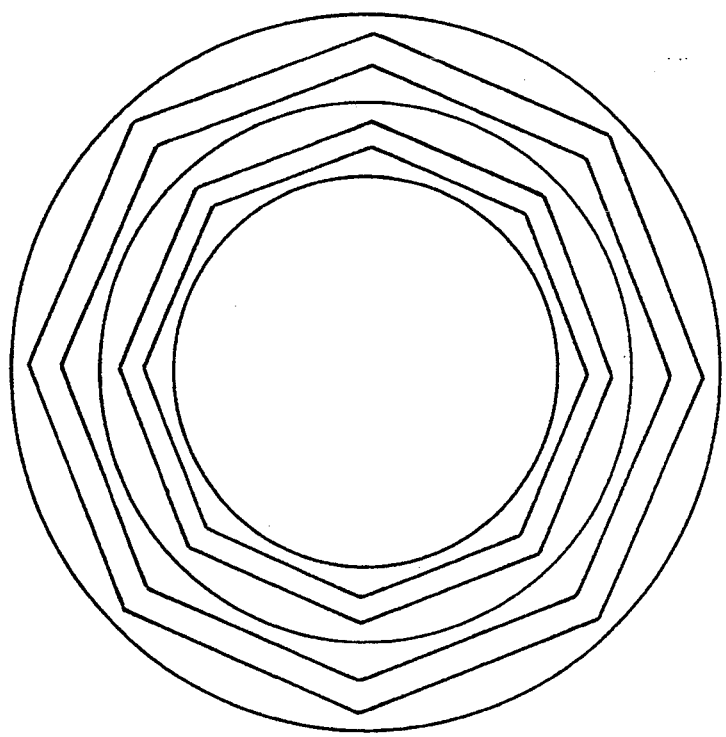
FIG. 8 is an exaggerated cross-sectional view showing a center ring having circular fins and a body ring having octagonal fins.

FIG. 8 shows substantially concentric, substantially circular fins of center ring 52 interleaved with substantially concentric, substantially octagonal fins of body ring 54.

To provide example of the compact size of the coupling, the fins 142-148 preferably have a cylindrical length of about 1 inch and are tapered in accordance with the foregoing description of fin 142. The fins 142-148 preferably have inner diameters (measured from their minimum taper or thickness) as follows:

| Fin | I.D. (inches) |
| --- | --- |
| 142 | 2.2 |
| 144 | 2.8 |
| 146 | 3.6 |
| 148 | 4.3 |

Body Ring

With reference to FIGS. 3 and 4, the body ring 4 preferably has a generally cylindrical section 160 connected, as by welding, to a rear surface 162 of a flat disk 164 to provide a curved surface 166 having a radius of curvature of about 0.125 inches. The rear surface 162 is spaced apart from a front surface 168 of the disk 164 such that the disk has a width or thickness of about 0.079 inches. An opening 170 is defined across the central thickness of the disk 164 and is concentrically and abuttingly aligned with a cylindrical opening 172 defined by the inner periphery of the cylindrical section 160.

The opening 170 and opening 172 are sized to receive the outer periphery 134 of the extension 128, as best seen in FIG. 3. To this end, the cylindrical section 160 provides an annular shoulder 174 having a length of about 0.9 inches and an inner diameter of about 2.67 inches between points P and Q, and an annular shoulder 176 having a length of about 0.32 inches and an inner diameter of about 2.5 inches between points Q and R.

The opening 170 provides an annular shoulder 178 located adjacent the shoulder 176 and having a length of about 0.08 inches and a diameter of about 1.75 inches between points R and S, and is tapered between points S and T to correspond to the taper of the shoulder 136 of the center ring 52.

Annular fins 180, 182, 184, 186 and 188 extend outwardly from the front surface 168 in a direction such that the major surfaces of the fins 180-188 are generally perpendicular to the front surface 168. The fins 180-188 are substantially concentric but could be substantially non-circular, preferably oval, in cross-section and tapered such that they decrease in thickness in a direction away from the front surface 168, as will be explained more fully below.

Corresponding and substantially concentric annular cavities 190, 192, 194, and 196 are defined between adjacent annular surfaces of the fins 180-188, to wit: annular cavity 190 is formed by the outer periphery of fin 180 and the inner periphery of fin 182, annular cavity 192 is formed by the outer periphery of fin 182 and the inner periphery of the fin 184, annular cavity 194 is formed by the outer periphery of fin 184 and the inner periphery of fin 186, and annular cavity 196 is formed by the outer periphery of fin 186 and the inner periphery of fin 188. The cavities 190-196 are filled with viscous fluid prior to assembly of the coupling 36, as will be explained more fully below.

Together, the fins 180-188 and cavities 190-196 provide a contoured annular pump surface 200 that cooperates with the pump surface 158 of the center ring 52 to exert pumping forces on the viscous fluid when the center ring 52 and the body ring 54 move relative to one another during operation of the coupling 36.

A plurality of sprocket teeth 202, i.e. about 34 teeth, are provided on the outermost periphery of the body ring 54 adjacent the fin 188 for engaging the chain 46. Each sprocket preferably has a pitch diameter of about 0.3125 inches and a width of about 1.14 inches. The chain 46 preferably has a width of about 1.375 inches and a pitch of about ½ inch. A threaded annular rim 204 is provided on the outermost peripheral edge of the body ring 154 adjacent the fin 188 for threadably receiving the cap 56.

Cap

As best seen in FIG. 3, the cap 56 generally resembles a hat in shape and has a crown 206 in the form of a blind bore 208 and a brim 210 in the form of a washer shaped disk 212 located at the open end of the bore 208.

The bore 208 preferably has a depth and sufficient to receive the end 102 of the shaft 50, and has a diameter sized to fit over the bearing 62.

The disk 212 has a front surface 214 spaced apart from a rear surface 216 and the inner diameter of the disk corresponds to the diameter of the bore 208 and the outer diameter of the disk 212 corresponds generally to the outer diameter of the fin 188 of the body ring 54. Threads are defined on the outer periphery of the disk 212 for threadably engaging the threaded rim 204 of the body ring 54.

Figure 5:
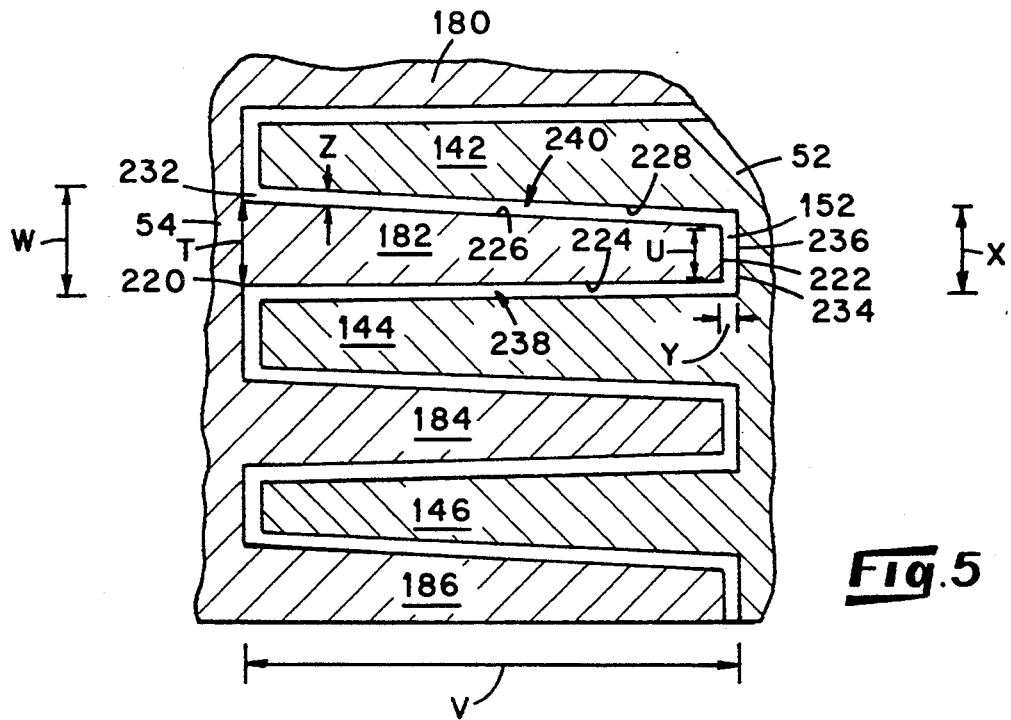
FIG. 5 is a close-up view of a portion of FIG. 3 showing the relationship between the annular fins of the center ring and the body ring of the fluid coupling in greater detail.

As mentioned previously, the center ring 52 is press-fit into the body ring 54 during assembly of the coupling. To this end, as best seen in FIG. 5, the fins 142-148 of the center ring 52 are shown received within the cavities 190-196, respectively, of the body ring 54, and the fins 180-188 are shown received within the cavities 150-156, respectively, of the center ring 52 so that the fins are positioned in a compact interleaved relationship.

The depicted fins 142-148 and fins 180-188 (and hence the corresponding cavities) are uniform in size and taper, however, it will be understood that the fins may be nonuniform in size and taper. The fins 142-148 and fins 180-188 may be integrally formed with the center ring 52 and body ring 54, respectively or may be attached, as by welding, to the front surfaces 122, 168 of the center ring and body ring 54.

For sake of brevity, the relationship between the fins 142-148 and fins 180-188 will be described only with respect to cavity 152 formed by fins 142, 144 of the center ring and of the fin 182 of the body ring, it being understood that the remaining fins are similarly disposed.

The fin 182 has a base 220 adjacent the front surface 168 and terminates in a tip 222 located about 1 inch from the base 220. The base 220 has a thickness T of about 0.16 inches, and the tip 222 has a thickness U of about 0.11 inches so that the fin 182 has a bottom annular surface 224 spaced apart from a top annular surface 226 in accordance with the taper of the fin 142. The fin 182 is preferably of substantially uniform taper from the base 220 to the tip 222, however, it will be understood that the thickness of the fin may be varied and that areas of nonuniform taper may be provided if desired.

The cavity 152 has annular spaced apart sidewalls 228, 230 formed by the inner periphery of the fin 144 and the outer periphery of the fin 142, respectively. The cavity 152 therefore provides an annular, tapered blind bore having a depth V of about 1 inch. Open end 232 of the cavity has a width W of about 0.24 inches and blind or closed end 234 of the cavity is provided by the surface 168 of the center ring 52 and has a width X of about 0.18 inches. The cavity 152 is preferably of substantially uniform taper from the open end 232 to the closed end 234, however, it will be understood that the thickness of the fins may be varied in a manner that provided areas of nonuniform taper if desired.

With continued reference to FIG. 5, it will be seen that the tip 222 of the fin 182 is spaced a distance Y from closed end 234 to define an annular channel or chamber 236 and the sidewalls 228 and 230 are spaced a distance Z and Z' from the surfaces 224 and 226, respectively, to define annular channels or chambers 238 and 240. The chambers 236, 238 and 240 are interconnected and provide a fluid filled annular space between the fin 182 and the cavity 152 in the assembled coupling. The distances Y, Z and Z' may be varied to adjust the size of the chambers 236-240 to provide desired torque characteristics, as set forth in more detail below.

During assembly of the coupling 36, each of the cavities 192-196 is filled with viscous fluid prior to assembly of the coupling 36. During assembly, the fins 142-148 are pressed into the fluid filled cavities 192-196, respectively, to form the fluid filled chambers 236, 238 and 240 relative to the fin 182 and cavity 152 and similar fluid filled chambers with respect to the remaining fins and cavities, it being understood that the interleaved relationship could likewise be explained in terms of insertion of the fins 180-188 into cavities 150-156.

In the preferred mode of operation, the coupling 36 transfers rotational forces from the transfer case 40 to the front drive shaft of the vehicle. In the depicted embodiment, the female end 22 of the input shaft fittingly receives the transmission of the vehicle (not shown) and rotates in response to rotational forces transmitted from the engine by the transmission. This rotation is transferred directly to the rear output shaft 16 and to the driven gear 24. The chain 46 directly engages teeth 242 located on the outer periphery of the driven gear and the tooth sprockets 202 on the body ring 54 so that rotation of the driven gear directly rotates the body ring 54. Rotation of the body ring 54 is then selectively coupled to the center ring 52 by the silicone fluid within the chambers 236, 238 and 240 to cause rotation of the center ring 52 in response to rotation of the body ring 54. The teeth 132 on the inner periphery of the extension 128 of the center ring 52 engage the splines 118 of the shaft 50 so that the center ring is directly linked to the shaft 50 and rotates in direct response to rotation of the center ring. Rotation of the shaft 50 is then directly coupled to the front drive shaft by the output shaft, which is directly connected to the shaft 50.

Under low torque conditions (i.e. up to about 225 ft lbs), the silicone fluid within the chambers 236, 238, and 240 has sufficient viscosity such that the center ring 52 rotates in unison with the body ring 54 under these conditions. Therefore, under low torque conditions, it will be appreciated that the center ring 52 and body ring 54 have the same rotational rate and there is no slippage or relative movement between the center ring 52 and the body ring 54. In addition, it will be appreciated that the rotation of the body ring 54 and center ring 52 provides centrifugal forces of rotation that compress the silicone fluid within the chambers 236, 238 and 240. This compression increases the torque that can be transferred from the center ring 52 to the body ring 54 via the silicone fluid.

Figure 6:
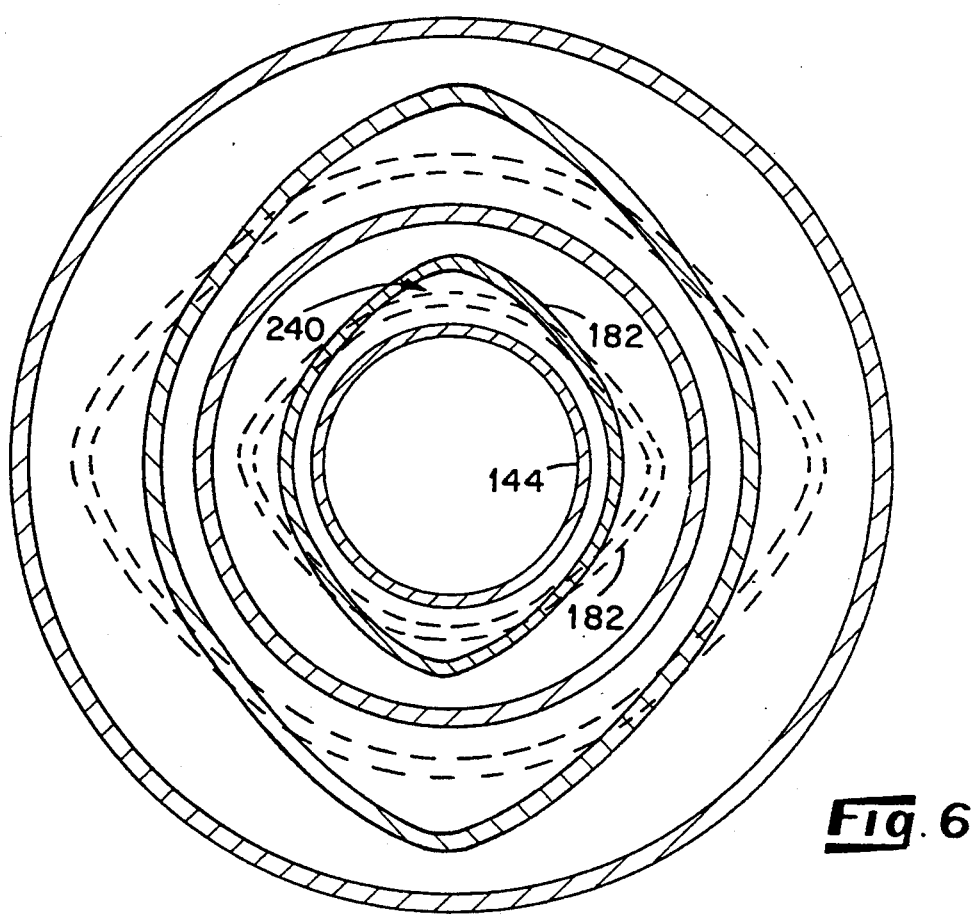
FIG. 6 is an exaggerated cross-sectional view showing a center ring having circular fins and a body ring having oval fins.

Under conditions in which the resistance to rotation of the center ring 52 becomes excessive, such as when the front wheels 44 of the four-wheel-drive vehicle are suddenly driven from a low resistance surface (ice) into a high resistance surface (dry asphalt), the wheels may cause the rotational rate of the center ring 52 to decrease. Under these conditions, the body ring 54 continues to rotate at the rate of the driven gear 24, but the center ring 52 rotates at a slower rate due to the increased resistance on the front wheels 44 such that the body ring 54 and center ring 52 move relative to one another. The relative movement of the center ring 52 and the body ring 54 results in relative movement between the cavity 152 (i.e. fins 142, 144) and fin 182 such that the orientation of the chambers 238 and 240 changes, as shown in phantom in FIG. 6.

As the chambers 238 and 240 reorient, the pump surfaces 158 and 200 of the cavity 152 and fin 182 exert a pumping action on the fluid and forcibly move or pump the fluid so that it moves relative to fins 142, 144 and 182 and migrates between the chambers 236, 238 and 240. This pumping action further compresses the silicone fluid within the chambers 236, 238 and 240 so that the ability of the fluid to transfer torque between the body ring 54 and the center ring 52 increases in response to the compression of the fluid. Torque transfer therefore increases as slip increases, since increased slip causes increased pumping action and compression of the fluid.

The pumping force exerted on the fluid is a function of the shape of the pump surfaces 158, 200 and the clearance between the pump surfaces 158 and 200. Accordingly, it will be appreciated that the same coupling components may be used to provide couplings having a wide range of characteristics and that a coupling may be adjusted to suit various conditions.

To this end, the distances Y, Z and Z' (discussed in connection with FIG. 5 above) may be varied to adjust the size of the chambers 236, 238 and 240 to provide desired torque characteristics. This may be accomplished, for example, by varying the position of retaining ring to vary the depth of insertion of the fins into the cavities or by providing other means for adjusting the clearance between the pump surfaces. For example, if the fin 182 is not inserted as deeply into the cavity 152, the spacings X, Z and Z' increase such that the pump surfaces 158 and 200 are farther apart and the volumes of the chambers 236, 238 and 240 increases.

This increase in volume decreases the pumping action exerted on the fluid by relative movement of the pump surfaces. Thus, it will be appreciated that the characteristics of the coupling may be adjusted simply by adjusting the clearance between the pump surfaces 158 and 200.

Figure 7:
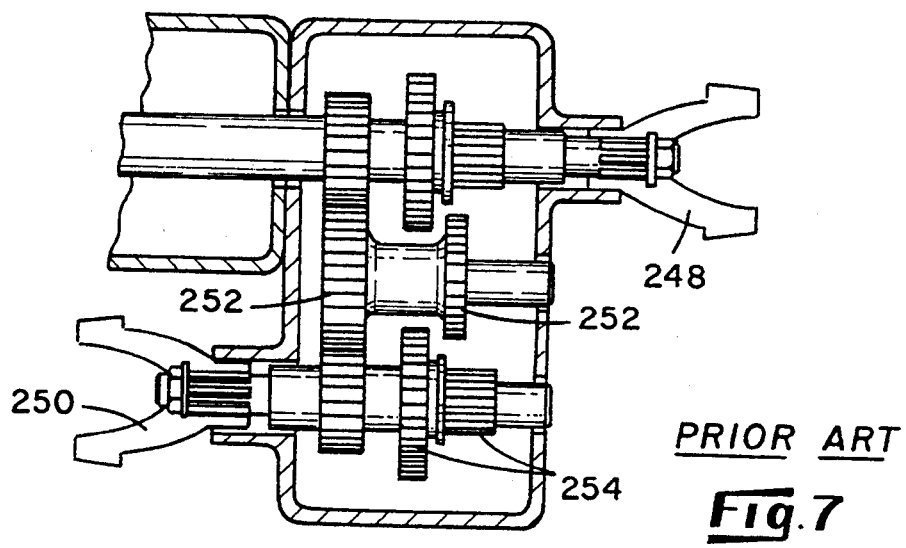
FIG. 7 is a cross-sectional view of a prior art transfer case.

In addition, the transfer case and coupling of the present invention provides a compact, uncomplicated transfer case that is resistant to damage. For example, during off-road operation, a four-wheel-drive vehicle may encounter a situation wherein the front wheels leave the ground and the rotational rate of the wheels increases greatly. This situation is particularly damaging to conventional transfer cases, such as transfer case 244 connected to a transmission 246 and having a rear output shaft 248 and a front output shaft 250 (FIG. 7), with damage typically occurring when the front wheels reengage the ground and large torque forces are applied to the vehicle drive train. With reference to FIG. 7, it will be appreciated that damage-may occur to the transmission and/or transfer case and/or other drive train components, since torque is directly transferred from transmission 246 to front output shaft 250 by transfer gears 252 and 254 which are not capable of relative movement to one another without damage. The transfer case of the present invention allows slip in this situation which helps prevent damage to drive train components.

As mentioned previously, the transfer case may be operated in three modes, i.e. (1) rear wheel drive only, with the front end disengaged so that the transfer case transfers torque only to the rear wheels of the vehicle, (2) locked four-wheel-drive with the center ring 52 directly locked to the body ring 54, and (3) selective four-wheel-drive where rotation of the body ring 54 is coupled to the center ring 52 by the fluid therebetween, as described previously.

The dog clutch 90 is provided to enable the user to choose between the mode of operation so that the transfer case may be operated in a manner commensurate with the conditions encountered. For example, for highway travel on dry roads, it may be desirable to select rear wheel drive only (mode 1) for increased gas mileage, while for highway travel on rain-slick roads, mode 2 may be preferred for increased traction. Finally, for off-road racing or travel on ice, the third mode may provide the desired operating mode.

Returning to FIGS. 1 and 3, the dog clutch 90 is a vacuum operated clutch and includes a shift diaphragm 256, a rod 258 slidably positionable within the housing 18 under the influence of vacuum supplied from the diaphragm 256 and having a pair of annular grooves 260 and 262, a spring-loaded, yieldably positionable ball stop 264 for engaging the grooves 260 and 262, a moveable dog 268 for engaging the body ring 54 and positioning link 270 extending between the dog 268 and the rod 258. An optional shift indicator 272 may be provided to indicate the position of the dog clutch.

In the first operating mode (rear wheel drive only), the front wheels 44 are disconnected from the front drive shaft 38 as by conventional locking hubs or "shift-on-the-fly" type mechanisms. In this mode, the sprocket (not shown) located between the input shaft 14 and the driven gear 24 is positioned so that the driven gear 24 is disengaged from the input shaft 14.

In the second and third modes, the front wheels 44 are connected to the front drive shaft 38 and the position of the sprocket is selected such that the driven gear is engaged with the input shaft so that rotation of the input shaft is transferred to the body ring 54 by the driven gear 24 and chain 46, wherein the chain 46 directly and rotatably engages tooth sprockets defined on the outer periphery of the body ring 16 to impart rotational forces from the driven gear 24 to the body ring 54. In both of these modes, the operating mode is selected by use of the dog clutch 90.

To provide the second mode of operation (locked four-wheel-drive), the shift diaphragm 256 is engaged to position the rod 258 within a channel 273 within the housing 18 so that the groove 260 defined thereon engages the ball stop 264. The position of the rod 256 is transferred to the dog 268 by the positioning link 270 such that the dog 268 becomes positioned in fitting engagement with an annular contact surface 274 on the body ring 54 so that the body ring 54. The annular surface 111 of the dog clutch 90 adjacent the dog 268 is configured to fittingly engage the splines 110 on the exterior of the splined section 96 of the shaft 50 so that rotation of the dog 268 is directly transferred to the shaft 50. Accordingly, it will be appreciated that in this mode of operation the dog 268 and body ring 54 are directly coupled to one another such that rotation of the body ring 54 imparted by the chain 46 is directly transferred to the dog 268 (and hence to the shaft 50 and front output shaft 38) without slippage. In addition, it will be appreciated that the center ring 52 is coupled directly to the shaft 50 by engagement of its teeth 132 with the splines 118 of the splined section 100 of the shaft 50. Because of this, the center ring 52 and body ring 54 are prevented from moving relative to one and there is no "pumping" action.

To provide the third mode of operation (selective four-wheel-drive), the shift diaphragm 256 is engaged to position the rod 258 within the channel 273 so that the groove 262 defined thereon engages the ball stop 264. The position of the rod 256 is transferred to the dog 268 by the positioning link 270 such that the dog 268 is spaced apart from and does not engage the annular contact surface 274. Rotation of the body ring 54 imparted by the chain 46 is thereafter coupled to the center ring 52 by the fluid therebetween and its associated pumping action, as previously described, and the resulting rotation of the center ring 52 is coupled directly to the shaft 50 by engagement of its teeth 132 with the splines 118 of the splined section 100 of the shaft 50.

The foregoing description of preferred embodiments of the present invention are given by way of illustration. In light thereof, those of ordinary skill in the art will appreciate that various modifications may be made without departing from the spirit and scope of the present invention.

I claim:

1. A transfer case for use in a drive train of a vehicle for selectively transferring rotational motion of a rotatable input shaft to first and second rotational output shafts, said transfer case comprising:
   a housing;
   a driven gear located within said housing and connected to the input shaft for being rotatably driven by the input shaft;
   a mechanical system for coupling the first output shaft to the input shaft;
   a fluid coupling located within the housing for coupling the driven gear to said second output shaft, said fluid coupling comprising:
   a first rotatable body,
   a second rotatable body connected to the second output shaft,
   a concentric plurality of concentric first fins extending outwardly from said first rotatable body separated by a concentric plurality of cylindrical cavities,
   a concentric plurality of concentric second fins extending outwardly from the second rotatable body, each of the second fins being disposed within one of the cavities,
   a viscous fluid disposed within the cavities for contacting the first and second fins, said fluid having a viscosity sufficiently great so that the first rotatable body and the second rotatable body rotate in unison during normal operation of the vehicle when the torque exerted upon the coupling is below a predetermined break-away torque;
   a support associated with the first and second rotatable bodies for maintaining the second fins within the cavities, and
   a seal associated with the first and second rotatable bodies and defining a sealed reservoir around the first and second fins for containing the viscous fluid; and
   a connector engageable with the driven gear and the first rotatable body for connecting the driven gear to the first rotatable body so that the first rotatable body is rotatable in response to rotation of the driven gear, and rotational motion of the first rotatable body is imparted by the viscous fluid to the second rotatable body,
   said fluid coupling providing rotation of the first and second rotatable bodies without substantial relative movement of the bodies during normal operation of the vehicle when the torque in the drive train exerted upon the coupling does not exceed the predetermined break-away torque.

* * * * *